Feb. 28, 1961  C. G. SUITS  2,972,937
FLASH APPARATUS
Filed March 14, 1958
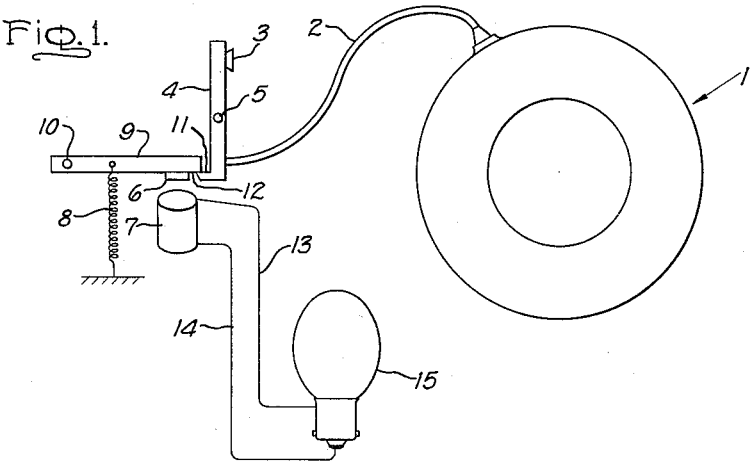
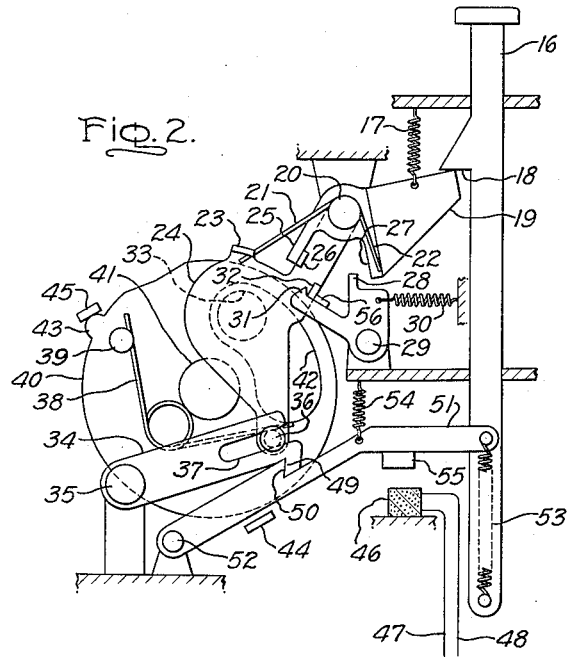
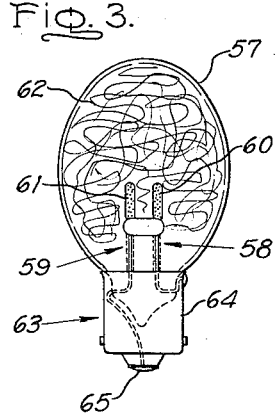
Inventor:
Chauncey G. Suits,
by Andrew J. Bootz
His Attorney.

United States Patent Office 2,972,937
Patented Feb. 28, 1961

2,972,937
FLASH APPARATUS

Chauncey G. Suits, Schenectady, N.Y., assignor to General Electric Company, a corporation of New York Filed Mar. 14, 1958, Ser. No. 721,430

4 Claims. (Cl. 95—11.5)

This invention relates in general to flash photography and more particularly to a new and novel apparatus for initiating the ignition of a photoflash lamp of the type used for photographic purposes to produce a flash of actinic light. A photoflash lamp of the type herein referred to is characterized in that its light output is due primarily to chemical reaction rather than to electrical energy.

One type of photographic flash lamp commonly in use at present comprises a sealed glass envelope or bulb having a charge of readily combustible metal foil loosely arranged within the bulb, a filling of a combustion supporting gas, and ignition means extending into the envelope and comprising primer of fulminating material coated on the inner ends of said means. When such a lamp is flashed, combustion is initiated by the igniting of the primer material, which in turn ignites the charge of readily combustible material. The combustible material reacts with the gaseous filling to produce a momentary flash of light of high intensity suitable for photographic purposes. The presently available commercial power pack employed to initiate ignition of the primer material comprises either a battery and condenser unit or a battery alone. While a power pack of this type produces good results under proper conditions, yet there exist certain difficulties such as failure of the lamp to fire if the battery should be weakened or run down or if there should be relatively poor contact in the circuit, as for instance between the lamp base and its socket. Further, the above described power source has an appreciable weight and volume, so that certain inconveniences are associated with its portability, particularly to the amateur photographer.

It is an object of this invention to overcome the aforesaid difficulties by providing an improved apparatus for flashing photoflash lamps.

Another object is to provide an improved power source for flashing photoflash lamps.

Still another object is to provide, in combination with a camera shutter, an improved power source for flashing photoflash lamps.

In accordance with one aspect of the invention, a photoflash lamp power pack comprises a piezoelectric crystal arranged to provide a conducting path to the terminals of the photoflash lamp, and means deforming the crystal in synchronized relation to the opening of a camera shutter. The deformation of the piezoelectric crystal produces the electrical energy required to flash the lamp. The deformation of the crystal may be accomplished by, for example, striking the crystal a sharp blow, or releasing the pressure on a prestressed or preloaded crystal.

The invention will best be understood by reference to the following detailed description and to the drawings, wherein:

Fig. 1 is a diagrammatic arrangement showing a modification of a camera shutter, a piezoelectric crystal, and a flash lamp arranged according to the present invention;

Fig. 2 is one modification of a camera shutter mechanism having incorporated therein a piezoelectric crystal as a power source; and Fig. 3 illustrates one flash lamp found particularly well suited for flashing with the power pack of the instant invention.

Referring to Fig. 1, there is shown a conventional camera shutter 1 actuated in a conventional manner by a cable release 2. The cable release 2 is operated by manual movement of knob 3 to the left, thereby rotating lever 4 about the stationary fulcrum 5 so as to depress the cable release 2 and thereby actuate the shutter. A hammer 6 is biased toward a piezoelectric crystal 7 by means of a spring 8 which tends to rotate a lever 9, carrying the hammer 6, about the stationary fulcrum 10 in a clockwise direction. Rotation of lever 9 is prevented by the engagement of the trigger projection 11 of lever 4 with the right end 12 of lever 9. However, simultaneously with the operation of the cable release 2 by movement of the knob 3 to the right, projection 11 disengages the end 12 of lever 9 permitting the hammer 6 to strike the crystal 7 due to the biasing of the spring 8. The blow of the hammer 6 upon the crystal 7 deforms the crystal slightly, changing its dimensions slightly, and developing a voltage across its two faces. The voltage developed across the faces of the crystal 7 is conducted by appropriate conductors 13, 14 to a flash lamp 15.

After the lamp 15 has been flashed in the aforesaid manner, the hammer 6 may be manually reset by engagement of trigger portion 11 of lever 4 with the end portion 12 of lever 9 so that the firing mechanism is in proper position for further firing of another flash lamp.

The crystal 7 is such that when given a sharp blow it emits a momentary voltage of steep wave front. While Rochelle salt crystals may be employed, a piezoelectric crystal of barium titanate will yield a voltage of some 200 to 1000 volts for a duration of a few microseconds with a total energy in the order of microwatts. A barium titanate piezoelectric crystal of about ⅛ inch in diameter and ⅛ inch thick will yield a potential of about 450 volts and has been employed satisfactorily for this purpose. However, a barium titanate crystal having larger dimensions would generate even greater energy in response to an appropriate mechanical deformation.

In Fig. 2 there is illustrated, by way of example, a piezoelectric crystal incorporated for synchronous operation with a camera shutter mechanism of otherwise commercial form. When the plunger 16 is depressed against the action of spring 17, a projection 18 in engagement with a lever 19 rotates the lever clockwise about a pin 20 and stresses a hair spring 21 which encircles the pin 20. One end of spring 21 engages a shoulder 22 on lever 19 and the other end engages a lug 23 on a shutter member 24 likewise pivoted on the pin 20. The end 25 of lever 19 moves away from projection 26 on member 24. Upon further pivotal movement of lever 19, a projection 27 thereon strikes an end of bell crank lever 28 to pivot it counterclockwise about pin 29 against the action of spring 30 and thereby causes the latch 31 to disengage from the key projection or lock 32 on shutter member 24. The release of key 32 from latch 31 permits the hair spring 21 to flip the shutter member 24 clockwise sufficiently far to expose the aperture 33. During its pivotal movement, the shutter member 24 causes a lever 34 to be pivoted counterclockwise about the pin 35 through engagement of a pin 36 on member 24 with a slot 37 in the end of lever 34. The pivoting of lever 34 in turn causes stressing of a hairspring 38 which is fixed at one end to the pin 36 and at the other end to a pin 39 mounted on a shutter disk member 40. The action of the hairspring 38 is such that just as the member 24 has exposed the aperture 33, the spring 38 uncoils to rapidly rotate the disk 40 counterclockwise about the pin 41 sufficiently far so that the arcuate slot 42 in disk 40 passes across the aperture 33, and the aperture is then again covered by an imperforate part of disk 40 to thereby time the exposure. The rotation of shutter disk 40 is terminated when a projection 43 thereon, normally engaging a stop 45, strikes a stop 44.

While the shutter mechanism is operating, means are also set in motion to strike an integrally contained piezoelectric crystal 46 which is connected by conductors 47, 48 to the contacts of a flash lamp. This action occurs when the lever 34 is pivoted to release its latching projection 49 from a key portion 50 of an arm or hammer 51. The arm 51 is pivoted at one end on a pin 52 and is connected at its other end by a spring 53 to the end of plunger 16. The spring 53 is sufficiently strong to overpower a return spring 54 when it is extended by depression of the plunger 16, so that the hammer or anvil 55 on arm 51 strikes the crystal 46 a sharp blow to thereby generate a high voltage current and flash a lamp connected to the conductors 47, 48. Upon release of plunger 16, the spring 54 returns the arm 51 to its original position, and the spring 17, by counterclockwise rotation of lever 19, returns the plunger 16 and shutter members 24 and 40 to their original positions against the effective stops 56 and 45 respectively. The time of operation of the shutter is synchronized such that the lamp is flashed while the shutter is open.

One type of flash lamp readily flashed by the discharge of a piezoelectric crystal according to the present invention is illustrated in Fig. 3. The lamp is more fully described and claimed in co-pending application Serial No. 639,959, filed February 13, 1957, by Warren F. Albrecht, now U.S. Patent 2,868,003, and assigned to the assignee of the present application, and need not be fully described herein. However, briefly, the lamp comprises a radiation transmitting bulb 57 preferably of glass. The bulb has hermetically sealed therein two electrodes 58, 59 which extend into the interior of the bulb and may be made of any suitable metal such as iron, copper, aluminum, nickel, etc. The electrodes 58, 59 are coated with a porous primer 60, 61 respectively which may be of a composition generally employed in the art and well known in the art. Such primers generally comprise a porous mixture of a readily ignitable metallic powder such as zirconium or a mixture of zirconium with magnesium, and an oxidizing agent such as potassium perchlorate, bonded together by a suitable binder such as nitrocellulose. By way of example, a suitable primer composition may consist of, by weight, 90% zirconium and 10% potassium perchlorate, formed as a suspension in a solution of nitrocellulose and amyl acetate and having a viscosity of about 24 centipoises × grams per cubic cm. The bulb 57 further contains the filling of a loose mass of combustible material 62, preferably in the form of shredded aluminum foil such as that in wide use today. The bulb also contains an atmosphere of combustion supporting gas, preferably oxygen at a suitable pressure which may be below or above atmospheric. The lamp may have any desired base 63. The electrodes 58, 59 are electrically secured to contacts 64, 65 which may form part of the base 63 and which may be electrically secured to conducting wires from the crystal such as conducting wires 47, 48 (Fig. 2).

The combustible material 62 forms a conducting path between the electrodes 58, 59 from which the foil is physically separated only by the normally insulating porous primer coating on one or both of the electrodes. The lamp is flashed by a power surge from the crystal. The voltage appearing across the terminals 64, 65 forms small arcs in completing a current path inside the lamp. This path starts from one electrode 58, arcing through the primer coating 60 to the foil 62 and through the foil to the other electrode 59 through the primer coating 61, thus completing the circuit. As explained above, the power surge is obtained by deforming the crystal so as to cause it to emit a momentary voltage sufficient to flash the lamp.

The piezoelectric crystal arranged according to the present invention and synchronized with a shutter, either by a cable release as illustrated in Fig. 1, or by incorporation of the crystal into the shutter mechanism as illustrated in Fig. 2, has very attractive features as a batteryless flash lamp igniter. The barium titanate crystal has a long life and is extremely reliable. The combined shutter mechanism, crystal, and associated deforming mechanism may be assembled as a complete article of manufacture and sold for use in many different types of cameras. Moreover, striking or deforming mechanisms for such piezoelectric crystals may be built into many different types of shutter mechanisms. It is only necessary to synchronize the voltage impulse from the crystal to the operation of the shutter so as to flash the lamp at the proper time.

Further, it is seeen from the above aforesaid dimentional description of the barium titanate crystal that while the crystal produces an electrical potential of substantial voltage, in the range of 200 to 1000 volts, the short duration of the potential, in the range of a few microseconds yields a very small total energy output which may be in the order of a few microwatts. It is therefore particularly advantageous in practicing the invention to employ a low energy initiated lamp, i.e., of the type which can be flashed by a low-energy impulse such as that described herein, in order to insure constant and reliable firing of the lamp. However, a suitable sized crystal can, of course, generate considerable more energy in response to a sufficient mechanical deformation than the aforesaid crystal given in the example of Fig. 1.

While certain specific embodiments of the invention have been shown by way of illustration, it is to be understood that many modifications will occur to those skilled in the art. The invention is to be limited only by the claims annexed to and forming a part of this specification.

What I claim as new and desire to secure by Letters Patent of the United States is:

1. In combination, a photographic apparatus comprising a camera shutter, means for actuating said shutter, a piezoelectric crystal, means arranged to deform said crystal, actuating means interconnecting said crystal deforming means with said shutter actuating means to effect synchronous operation thereof, and a photographic flash lamp comprising a sealed radiation transmitting bulb, a pair of spaced metallic electrodes extending into said bulb, one of said electrodes having substantially its full length within the bulb coated with electrically insulating material, at least a portion of said insulating material, consisting of a primer, a loose mass of metallic combustible material substantially filling said bulb and in contact with both the primer on said one electrode and with the other electrode and forming an electrically conducting path therebetween for formation of a spark discharge between said one electrode and the combustible material through said primer upon application of a high-voltage low-energy impulse to said electrodes, and a combustion supporting atmosphere in said bulb, said piezoelectric crystal being electrically connected across the electrodes of said lamp so as to apply a voltage thereacross effective to flash the lamp immediately upon deformation of the crystal by said deforming means.

2. In combination, a photographic apparatus comprising a camera shutter, means for actuating said shutter, a piezoelectric crystal, a hammer arranged to strike said crystal, hammer actuating means interconnecting said hammer with said shutter actuating means to effect synchronous operation thereof and a photographic flash lamp comprising a sealed radiation transmitting bulb, a pair of spaced metallic electrodes extending into said bulb, one of said electrodes having substantially its full length within the bulb coated with electrically insulating material, at least a portion of said insulating material consisting of a primer, a loose mass of metallic combustible material substantially filling said bulb and in contact with both the primer on said one electrode and with the other electrode and forming an electrically conducting path therebetween for formation of a spark discharge between said one electrode and the combustible material through said primer upon application of a high-voltage low-energy impulse to said electrodes, and a combustion supporting atmosphere in said bulb, said piezoelectric crystal being electrically connected across the electrodes of said lamp so as to apply a voltage thereacross effective to flash the lamp immediately upon striking of the crystal by said hammer.

3. In combination, a photographic apparatus comprising a camera shutter, means for actuating said shutter, a piezoelectric crystal, a movable hammer spring-biased toward and arranged to strike said crystal, locking means engaging and normally holding said hammer in a retracted position away from said crystal, hammer actuating means interconnecting said hammer with said shutter actuating means to simultaneously operate said shutter and release said locking means to cause said hammer to strike said crystal, and a photographic flash lamp of the low-energy initiated type connected across the said piezoelectric crystal and adapted to be flashed by the voltage generated thereby immediately upon being struck by said hammer.

4. In combination, a photographic apparatus comprising a camera shutter, means for actuating said shutter, a piezoelectric crystal, a movable hammer spring-biased toward and arranged to strike said crystal, said shutter actuating means including locking means engaging and normally holding said hammer in a retracted position away from said crystal, hammer actuating means interconnecting said hammer with said shutter actuating means to simultaneously operate said shutter and release said locking means to cause said hammer to strike said crystal, and a photographic flash lamp of the low-energy initiated type connected across the piezoelectric crystal and adapted to be flashed by the voltage generated thereby immediately upon being struck by said hammer.

References Cited in the file of this patent

UNITED STATES PATENTS

| | | |
|---|---|---|
| 2,261,073 | Painter | Oct. 28, 1941 |
| 2,299,497 | Rosenthal | Oct. 20, 1942 |
| 2,328,831 | Mendelsohn | Sept. 7, 1943 |
| 2,486,010 | Edgerton | Oct. 25, 1949 |
| 2,584,858 | Fritz | Feb. 5, 1952 |
| 2,717,589 | Harkness | Sept. 13, 1955 |